(12) United States Patent
Yamada et al.

(10) Patent No.: US 8,125,714 B2
(45) Date of Patent: Feb. 28, 2012

(54) ANTI-REFLECTION COATING, OPTICAL MEMBER, EXCHANGE LENS UNIT AND IMAGING DEVICE

(75) Inventors: Kazuhiro Yamada, Saitama (JP); Hiroyuki Nakayama, Tokyo (JP); Mineta Suzuki, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 441 days.

(21) Appl. No.: 12/392,297

(22) Filed: Feb. 25, 2009

(65) Prior Publication Data
US 2009/0219620 A1    Sep. 3, 2009

(30) Foreign Application Priority Data
Feb. 28, 2008   (JP) ................................ 2008-047421

(51) Int. Cl.
*G02B 1/10*   (2006.01)

(52) U.S. Cl. ...................................... 359/588; 359/581

(58) Field of Classification Search .......... 359/580–581, 359/586–589
See application file for complete search history.

(56) References Cited

U.S. PATENT DOCUMENTS

| | | | |
|---|---|---|---|
| 2008/0192350 A1* | 8/2008 | Yamada et al. | 359/582 |
| 2010/0027123 A1* | 2/2010 | Imai et al. | 359/586 |

FOREIGN PATENT DOCUMENTS

| | | |
|---|---|---|
| JP | 5-085778 | 4/1993 |
| JP | 10-020102 | 1/1998 |
| JP | 2001-100002 | 4/2001 |
| JP | 2002-107506 | 4/2002 |
| JP | 2005-352303 | 12/2005 |
| JP | 2006-003562 | 1/2006 |
| JP | 2007-094150 | 4/2007 |

OTHER PUBLICATIONS

U.S. Appl. No. 12/342,128, filed Dec. 23, 2008, and entitled "Anti-Reflection Coating, Optical Member, Exchange Lens Unit and Imaging Device".

U.S. Appl. No. 11/620,805, filed on Jan. 8, 2007, and entitled "Optical Element with Antireflection Coating," which was published as U.S. 2008/019350.

* cited by examiner

*Primary Examiner* — Stephone Allen
*Assistant Examiner* — Kimberly N Kakalec
(74) *Attorney, Agent, or Firm* — Greenblum & Bernstein, PLC

(57) ABSTRACT

An anti-reflection coating comprising first to seventh layers formed on a substrate in this order, the first layer being an alumina-based layer, the seventh layer being a porous, silica-based layer, and each of the first to seventh layers having predetermined refractive index and optical thickness in a wavelength range of 400-700 nm.

12 Claims, 4 Drawing Sheets

ANTI-REFLECTION COATING, OPTICAL MEMBER, EXCHANGE LENS UNIT AND IMAGING DEVICE

FIELD OF THE INVENTION

The present invention relates to an anti-reflection coating having excellent anti-reflection performance and tarnish-preventing effect on a glass substrate having a low to medium refractive index, thus suitable for exchange lens units for single-lens reflex cameras, etc., an optical member comprising such an anti-reflection coating, and an exchange lens unit and an imaging device comprising such an optical member.

BACKGROUND OF THE INVENTION

A high-performance, single-focus or zoom lens unit for single-lens reflex cameras, etc. generally has about 10-40 lenses in a lens barrel. Each lens has a laminated anti-reflection coating comprising pluralities of dielectric layers each having a different refractive index from that of a lens substrate and a thickness of ½λ or ¼λ, wherein λ is a center wavelength, to utilize interference effects.

For instance, when an anti-reflection coating formed on each of 20 lenses has reflectance of 0.5%, its transmittance is $0.995^{40} = 0.818$ because the number of lens surfaces is 40, resulting in reflection loss of about 18%. Because reflection is superimposed in and between the lenses, large reflection loss of each lens provides the resultant photographs with flare and ghost, as well as reduced contrast. Accordingly, an anti-reflection coating with small reflection loss should be formed on a lens used in single-focus or zoom lens units.

In addition, blue tarnish, white tarnish, etc. may occur on the surface of a lens during a production process. The blue tarnish is a thin film formed by basic components in optical glass dissolved into dew attached to a surface of the optical glass left in the air, or water during a grinding step. The white tarnish is white blot generated by the chemical reaction of components eluted from the glass. Accordingly, the anti-reflection coating formed on a glass lens should have a function to prevent tarnish.

JP 5-85778 A discloses an optical member comprising an anti-reflection coating having pluralities of dielectric layers on an optical substrate, the innermost layer being made of $SiO_x$ ($1 \leq x \leq 2$) and having a thickness nd of $0.25\lambda_0$ or more, wherein $\lambda_0$ is a designed wavelength. An anti-reflection coating having such structure serves to make tarnish and scratches, if any, on the substrate surface less conspicuous, but it has poor anti-reflection performance, and fails to fully prevent tarnish.

JP 10-20102 A discloses an anti-reflection coating comprising first to seventh layers formed in this order on a substrate having a refractive index of about 1.4-1.9 at a reference wavelength $\lambda_0$ arbitrarily designed in a visible wavelength range, the first to seventh layers meeting the following conditions: $1.35 \leq n_1 \leq 1.80$, $1.90 \leq n_2 \leq 2.50$, $1.35 \leq n_3 \leq 1.80$, $1.90 \leq n_4 \leq 2.50$, $1.35 \leq n_5 \leq 1.80$, $1.90 \leq n_6 \leq 2.50$, $1.35 \leq n_7 \leq 1.50$, $0.0450\lambda_0 \leq n_1 d_1 \leq 0.2500\lambda_0$, $0.0450\lambda_0 \leq n_2 d_2 \leq 0.1300\lambda_0$, $0.0450\lambda_0 \leq n_3 d_3 \leq 0.1100\lambda_0$, $0.2100\lambda_0 \leq n_4 d_4 \leq 0.3000\lambda_0$, $0.0450\lambda_0 \leq n_5 d_5 \leq 0.0750\lambda_0$, $0.1000\lambda_0 \leq n_6 d_6 \leq 0.1600\lambda_0$, $0.2350\lambda_0 \leq n_7 d_7 \leq 0.2900\lambda_0$, wherein $n_1$-$n_7$ are the refractive indices of the first to seventh layers, and $n_1 d_1$-$n_7 d_7$ are the optical thickness of the first to seventh layers. Although this anti-reflection coating has a tarnish-preventing function because the first layer is made of alumina, its anti-reflection performance to visible light in wavelength of around 400 nm or 700 nm is insufficient.

JP 2001-100002 A discloses an anti-reflection coating having a 10-layer structure comprising a $MgF_2$ layer, a $ZrO_2/TiO_2$ layer, an $Al_2O_3$ layer, a $SiO_2$ layer, a $ZrO_2/TiO_2$ layer, a $SiO_2$ layer, a $ZrO_2/TiO_2$ layer, a $SiO_2$ layer, a $ZrO_2/TiO_2$ layer, and an $Al_2O_3$ layer in this order from the surface, which has reflectance of about 0.1% at a visible wavelength of 270 nm. JP 2002-107506 A discloses an anti-reflection coating having a 10-layer structure comprising a $MgF_2$ layer, a $ZrO_2/TiO_2$ layer, a $SiO_2$ layer, an $Al_2O_3$ layer, a $ZrO_2/TiO_2$ layer, a $SiO_2$ layer, a $ZrO_2/TiO_2$ layer, a $SiO_2$ layer, a $ZrO_2/TiO_2$ layer, and an $Al_2O_3$ layer in this order from the surface, which has reflectance of about 0.1% at a visible wavelength of 300 nm. However, because the reflectance is about 0.1%, this anti-reflection coating has transmittance of about 96% when applied to 20 lenses, resulting in reflection loss of about 4%.

JP 2005-352303 A discloses an anti-reflection coating comprising pluralities of layers each having a physical thickness of 15-200 nm, which are formed on a substrate such that their refractive indices decrease gradually from the substrate side, the refractive index difference between adjacent layers and between the innermost layer and the substrate being 0.02-0.2, and the outermost layer being a silica aerogel layer. However, it has as large reflectance as more than 0.5% to visible light near a wavelength of 400 nm, and fails to fully prevent tarnish.

JP 2006-3562 A discloses an anti-reflection coating comprising pluralities of layers each having a physical thickness of 15-200 nm, which are formed on a substrate such that their refractive indices decrease gradually from the substrate side, the refractive index difference between adjacent layers and between the innermost layer and the substrate being 0.02-0.2, the innermost layer being an alumina layer, and the outermost layer being a silica aerogel layer. Although this anti-reflection coating has a tarnish-preventing function because the innermost layer is made of alumina, it does not have sufficient reflectance to visible light near a wavelength of 400 nm.

JP 2007-94150 A discloses an anti-reflection coating having 5 or 6 layers, the outermost layer being a silica aerogel layer, which has reflectance of 0.05% or less to visible light in a wavelength range of 400-700 nm at an incident angle of 5°. However, because the innermost layer is made of $Ta_2O_5$ or $ZrO_2$, tarnish cannot be fully suppressed.

OBJECT OF THE INVENTION

Accordingly, an object of the present invention is to provide an anti-reflection coating having excellent anti-reflection performance and tarnish-preventing effect on a glass substrate having a low to medium refractive index, an optical member having such an anti-reflection coating, and an exchange lens unit and an imaging device comprising such an optical member.

DISCLOSURE OF THE INVENTION

Thus, the anti-reflection coating of the present invention comprises first to seventh layers formed on a substrate in this order, the first layer being an alumina-based layer, the seventh layer being a porous, silica-based layer, and in a wavelength range of 400-700 nm,
  the substrate having a refractive index of 1.45-1.72,
  the first layer having an optical thickness of 25.0-250.0 nm,
  the second layer having a refractive index of 1.95-2.23 and an optical thickness of 27.5-52.5 nm,
  the third layer having a refractive index of 1.33-1.50 and an optical thickness of 37.5-54.0 nm, the fourth layer having a refractive index of 2.04-2.24 and an optical thickness of 45.0-62.5 nm, the fifth layer having a refractive index of 1.33-1.50 and an optical thickness of 77.5-102.5 nm, the sixth layer having a refractive index of 1.85-2.40 and an optical thickness of 16.0-26.5 nm, and the seventh layer having an optical thickness of 112.5-162.5 nm.

The second layer, the fourth layer and the sixth layer are preferably made of (a) at least one material selected from the group consisting of $Ta_2O_5$, $TiO_2$, $Nb_2O_5$, $ZrO_2$, $HfO_2$, $CeO_2$, $SnO_2$, $In_2O_3$, ZnO and $Pr_6O_{11}$, or (b) a combination of at least one material selected from the group consisting of $Ta_2O_5$, $TiO_2$, $Nb_2O_5$, $ZrO_2$, $HfO_2$, $CeO_2$, $SnO_2$, $In_2O_3$, ZnO and $Pr_6O_{11}$, and $Y_2O_3$, and the third layer and the fifth layer are preferably made of (c) $MgF_2$ and/or $SiO_2$, or (d) a combination of $MgF_2$ and/or $SiO_2$, and $Al_2O_3$.

The first layer preferably has a refractive index of 1.58-1.71.

The seventh layer preferably has a refractive index of 1.09-1.19.

The seventh layer is preferably a silica aerogel layer.

The anti-reflection coating preferably has reflectance of 0.3% or less to incident light at 0° in a wavelength range of 450-600 nm.

A fluororesin layer as thick as 0.4-100 nm having water repellency or water/oil repellency is preferably formed on the seventh layer.

The first to sixth layers are preferably formed by a physical film-forming method, and the seventh layer is preferably formed by a wet method.

The physical film-forming method is preferably a vacuum vapor deposition method, and the wet method is preferably a sol-gel method.

The optical member of the present invention has the above anti-reflection coating.

Each of the exchange lens unit and imaging device of the present invention comprises the above optical member.

DESCRIPTION OF THE PREFERRED EMBODIMENTS

[1] Anti-Reflection Coating
(1) Layer Structure of Anti-Reflection Coating

Figure 1:
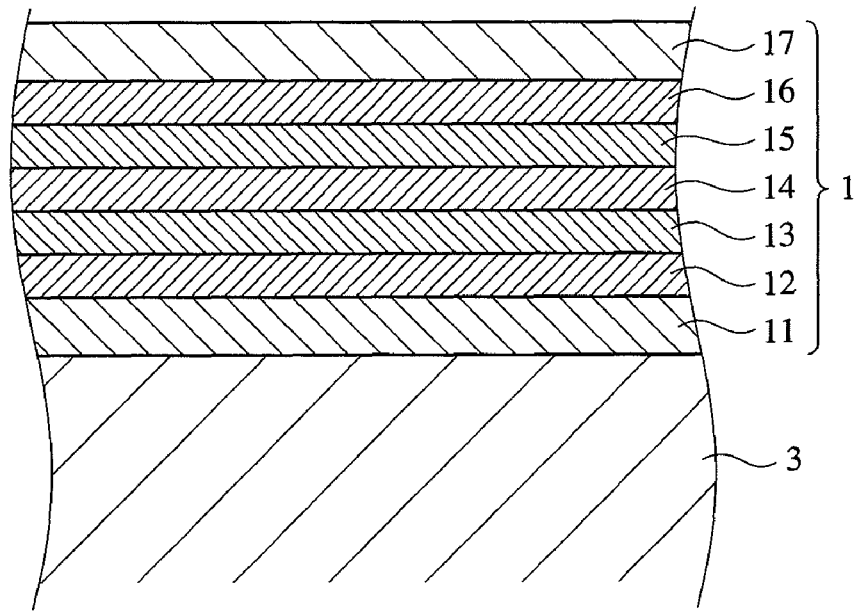
FIG. 1 is a cross-sectional view showing the anti-reflection coating formed on a substrate according to one embodiment of the present invention.

The anti-reflection coating 1 according to one embodiment of the present invention comprises, as shown in FIG. 1, first to seventh layers 11-17 formed on a substrate 3 in this order. The first layer 11 is based on alumina, and the seventh layer 17 is a porous, silica-based layer. In a wavelength range of 400-700 nm, each of the substrate 3 and the layers 11-17 has the following refractive index and optical thickness [refractive index×physical thickness]:

the substrate 3 has a refractive index of 1.45-1.72,
the first layer 11 has an optical thickness of 25.0-250.0 nm,
the second layer 12 has a refractive index of 1.95-2.23 and an optical thickness of 27.5-52.5 nm,
the third layer 13 has a refractive index of 1.33-1.50 and an optical thickness of 37.5-54.0 nm,
the fourth layer 14 has a refractive index of 2.04-2.24 and an optical thickness of 45.0-62.5 nm,
the fifth layer 15 has a refractive index of 1.33-1.50 and an optical thickness of 77.5-102.5 nm,
the sixth layer 16 has a refractive index of 1.85-2.40 and an optical thickness of 16.0-26.5 nm, and
the seventh layer 17 has an optical thickness of 112.5-162.5 nm.

The refractive index of the alumina-based first layer 11 is preferably 1.58-1.71, more preferably 1.60-1.70. The first layer 11 preferably has an optical thickness of 120-210 nm. Alumina has particularly high adhesion to a glass substrate, high transmittance in a wide wavelength range, high hardness, excellent wear resistance, and good cost efficiency. Because alumina has excellent shielding to water vapor, the alumina-based first layer 11 can prevent tarnish on the surface of the substrate 3.

The seventh layer 17 is preferably made of a silica aerogel to provide a low refractive index and an excellent anti-reflection function. The refractive index of the seventh layer 17 is preferably 1.09-1.19, more preferably 1.12-1.17. The porous seventh layer 17 preferably has a pore diameter of 0.005-0.2 μm, a porosity of 55-80%, and an optical thickness of 130-155 nm. The seventh layer 17 made of a silica aerogel may be hydrophobized. The hydrophobized silica aerogel layer has excellent water resistance.

The second layer 12 preferably has an optical thickness of 30-50 nm and a refractive index of 2.00-2.15. The third layer 13 preferably has an optical thickness of 42-53 nm and a refractive index of 1.35-1.48. The fourth layer 14 preferably has an optical thickness of 40-60 nm and a refractive index of 2.05-2.15. The fifth layer 15 preferably has an optical thickness of 85-95 nm and a refractive index of 1.35-1.47. The sixth layer 16 preferably has an optical thickness of 20-25 nm and a refractive index of 1.95-2.30.

(2) Materials

The first layer 11 is based on alumina (aluminum oxide), whose purity is preferably 99% or more. Any of the second layer 12, the fourth layer 14 and the sixth layer 16 is preferably made of (a) at least one material selected from the group consisting of $Ta_2O_5$, $TiO_2$, $Nb_2O_5$, $ZrO_2$, $HfO_2$, $CeO_2$, $SnO_2$, $In_2O_3$, ZnO and $Pr_6O_{11}$, or (b) a combination of at least one material selected from the group consisting of $Ta_2O_5$, $TiO_2$, $Nb_2O_5$, $ZrO_2$, $HfO_2$, $CeO_2$, $SnO_2$, $In_2O_3$, ZnO and $Pr_6O_{11}$, and $Y_2O_3$. Any of the third layer 13 and the fifth layer 15 is preferably made of (c) $MgF_2$ and/or $SiO_2$, or (d) a combination of $MgF_2$ and/or $SiO_2$, and $Al_2O_3$. The seventh layer 17 is based on silica, which is preferably silica aerogel.

(3) Production Method

[a] Formation Method of First to Sixth Layers

The first layer 11 to the sixth layer 16 are preferably formed by a physical film-forming method such as a vacuum vapor deposition method, a sputtering method, etc., particularly a vacuum vapor deposition method from the aspect of a production cost and precision.

The vacuum vapor deposition method may be a resistor-heating type, an electron-beam type, etc. The electron-beam vacuum vapor deposition method will be explained below referring to a vacuum vapor deposition apparatus 30 shown in FIG. 7. The vacuum vapor deposition apparatus 30 comprises, in a vacuum chamber 31, a rotatable rack 32 for carrying pluralities of lenses on its inner surface, a vapor source 33 comprising a crucible 36 containing an evaporating material, an electron beam irradiator 38, a heater 39, and a vacuum pump connector 35 connected to a vacuum pump 40. To form the first to sixth layers in the anti-reflection coating 1 on each lens 100, the lens 100 is attached to the rotatable rack 32 such that its surface is oriented to the vapor source 33, and the evaporating material 37 is placed in the crucible 36. After the vacuum chamber 31 is evacuated by the vacuum pump 40 connected to the vacuum pump connector 35, the lens 100 is heated by the heater 39. While rotating the rotatable rack 32 by a shaft 34, electron beams are irradiated from the electron beam irradiator 38 to the evaporating material 37 to heat it. The vaporized material 37 is deposited on the lens 100, so that each layer in the anti-reflection coating 1 is formed on the lens 100.

In the vacuum vapor deposition method, the initial degree of vacuum is preferably $1.0 \times 10^{-5}$ Torr to $1.0 \times 10^{-6}$ Torr. When the degree of vacuum is less than $1.0 \times 10^{-5}$ Torr, insufficient vapor deposition occurs. When the degree of vacuum is more than $1.0 \times 10^{-6}$ Torr, it takes too much time for vapor deposition, resulting in poor production efficiency. To increase the precision of the formed layers, it is preferable to heat the lens during vapor deposition. The lens temperature during vapor deposition may be properly determined based on the heat resistance of the lens and the vapor deposition speed, but it is preferably 60-250° C.

[b] Formation Method of Seventh Layer
(i) Preparation of Organically Modified Silica Dispersion
(i-1) Formation of Wet Gel The wet gel is formed by dissolving a silica-skeleton-forming compound and a catalyst in a solvent, causing the hydrolysis and polymerization of the silica-skeleton-forming compound, and then conducting aging. The preferred procedures of forming the wet gel will be explained below.

(a) Silica-Skeleton-Forming Compound
(a-1) Saturated Alkoxysilane and Silsesquioxane Silica sol and gel are formed by the hydrolysis and polymerization of alkoxysilane and/or silsesquioxane. The saturated alkoxysilane may be a monomer or an oligomer. The saturated alkoxysilane monomer preferably has 3 or more alkoxy groups. Using a saturated alkoxysilane having 3 or more alkoxy groups as a silica-skeleton-forming compound, anti-reflection coatings with excellent uniformity can be obtained. Specific examples of the saturated alkoxysilane monomers include methyltrimethoxysilane, methyltriethoxysilane, phenyltriethoxysilane, tetramethoxysilane, tetraethoxysilane, tetrapropoxysilane, tetrabutoxysilane, diethoxydimethoxysilane, dimethyldimethoxysilane, and dimethyldiethoxysilane. The saturated alkoxysilane oligomers are preferably polycondensates of these monomers. The saturated alkoxysilane oligomers can be obtained by the hydrolysis and polymerization of the monomers.

The use of a saturated silsesquioxane as a silica-skeleton-forming compound can also provide an anti-reflection coating with excellent uniformity. The saturated silsesquioxane is a general name of polysiloxanes in the form of network, which have structural units represented by the general formula: $RSiO_{1.5}$, wherein R represents an organic functional group. R may be, for instance, a linear or branched alkyl group having 1-6 carbon atoms, a phenyl group, or an alkoxy group (a methoxy group, an ethoxy group, etc.). It is known that the silsesquioxane has various structures such as a ladder structure, a cage structure, etc. It has excellent weather resistance, transparency and hardness, suitable as a silica-skeleton-forming compound for the silica aerogel.

(a-2) Unsaturated Alkoxysilane and Silsesquioxane

An unsaturated monomer or oligomer of alkoxysilane or silsesquioxane having an ultraviolet-polymerizable unsaturated group may be used as a silica-skeleton-forming compound. The unsaturated alkoxysilane monomer has an organic group having at least one double or triple bond (hereinafter referred to as "unsaturated group"), and an alkoxy group. The unsaturated group has 2-10 carbon atoms, preferably 2-4 carbon atoms.

The preferred unsaturated alkoxysilane monomer is represented by the following general formula (1);

$$R^a Si(OR^b)_3 \qquad (1),$$

wherein $R^a$ represents an organic group having an unsaturated bond and 2-10 carbon atoms, and $R^b O$ represents an alkoxy group having 1-4 carbon atoms.

The unsaturated group $R^a$ is an organic group having at least one unsaturated bond, which may have a substituting group such as a methyl group, an ethyl group, etc. Specific examples of the unsaturated group $R^a$ include a vinyl group, an allyl group, a methacryloxy group, an aminopropyl group, a glycidoxy group, an alkenyl group and a propargyl group. $R^b$ is an organic group, which may be the same as or different from $R^a$. Specific examples of the alkoxy group $R^b O$ include a methoxy group, an ethoxy group, a propoxy group, a butoxy group, an isopropoxy group and an s-butoxy group.

Specific examples of the unsaturated alkoxysilane monomers include trimethoxyvinylsilane, triethoxyvinylsilane, allyltrimethoxysilane, allyltriethoxysilane, tributoxyvinylsilane, tripropoxyvinylsilane, allyltributoxysilane, allyltripropoxysilane, dimethoxydivinylsilane, diallyldimethoxysilane, diethoxydivinylsilane, diallyldiethoxysilane, trimethoxy(3-butenyl)silane, triethoxy(3-butenyl)silane, di(3-butenyl)dimethoxysilane, and di(3-butenyl)diethoxysilane.

An oligomer of the unsaturated alkoxysilane may be used as a silica-skeleton-forming compound. The unsaturated alkoxysilane oligomer also has at least one unsaturated group and at least one alkoxy group. The unsaturated alkoxysilane oligomer is preferably represented by the following general formula (2);

$$Si_m O_{m-1} R^a_{2m+2-x} OR^b_x \qquad (2),$$

wherein $R^a$ represents an organic group having an unsaturated bond and 2-10 carbon atoms, $R^b O$ represents an alkoxy group having 1-4 carbon atoms, m represents an integer of 2-5, and x represents an integer of 4-7. Preferred examples of the unsaturated groups $R^a$ and the alkoxy groups $R^b O$ are the same as those in the above alkoxysilane monomers.

The number m of condensation is preferably 2-3. An oligomer whose number m of condensation is 5 or less can be easily obtained by the polymerization of the monomer using an acidic catalyst as described below. The number x of the alkoxy group is preferably 3-5. When the number x of the alkoxy group is less than 3, the hydrolysis and polycondensation of the alkoxysilane does not sufficiently proceed, making three-dimensional cross-linking difficult to occur, thereby making the formation of a wet gel too difficult. When the number x of the alkoxy group is more than 5, the percentage of the unsaturated group is too small, resulting in insufficient increase in mechanical strength by the polymerization. Specific examples of the unsaturated alkoxysilane oligomers include disilanes, trisilanes and tetrasilanes obtained by the condensation of the above unsaturated alkoxysilane monomers.

(b) Solvent

The solvent is preferably composed of water and alcohol. The alcohol is preferably methanol, ethanol, n-propanol, and isopropanol, particularly ethanol. How active the hydrolysis and polycondensation reaction are depends on a molar ratio of the monomer and/or oligomer of alkoxysilane or silsesquioxane (silica-skeleton-forming compound) to water. Though the water/alcohol molar ratio does not directly affect the hydrolysis and polycondensation reaction, it is preferably substantially 0.1-2. When the water/alcohol molar ratio is more than 2, the hydrolysis proceeds too quickly. When the water/alcohol molar ratio is less than 0.1, the hydrolysis of the silica-skeleton-forming compound does not sufficiently occur.

(c) Catalyst

A catalyst for the hydrolysis reaction is added to an aqueous solution of the silica-skeleton-forming compound. The catalyst may be acidic or basic. For instance, an efficient hydrolysis can be proceeded by condensing the silica-skeleton-forming compound monomer to an oligomer in an aqueous solution containing an acidic catalyst, and polymerizing the oligomer in a solution containing a basic catalyst. Specific examples of the acidic catalysts include hydrochloric acid, nitric acid and acetic acid. Specific examples of the basic catalysts include ammonia, amines, NaOH and KOH. Preferred examples of the amines include alcohol amines, and alkyl amines (methylamine, dimethylamine, trimethylamine, n-butylamine, and n-propylamine, etc.).

(d) Formulation

The silica-skeleton-forming compound is preferably dissolved in the solvent, such that a molar ratio of the solvent to alkoxysilane is 3-100. When the molar ratio is less than 3, the degree of polymerization of the alkoxysilane is too high. When the molar ratio exceeds 100, the degree of polymerization of the alkoxysilane becomes too low. A catalyst/alkoxysilane molar ratio is preferably $1\times10^{-7}$ to $1\times10^{-1}$, more preferably $1\times10^{-2}$ to $1\times10^{-1}$. When the molar ratio is less than $1\times10^{-7}$, the hydrolysis of the alkoxysilane does not occur sufficiently. Even at a molar ratio of more than $1\times10^{-1}$, increased catalytic effects cannot be obtained. A water/alkoxysilane molar ratio is preferably 0.5-20, more preferably 5-10.

(e) Aging

A solution containing the silica-skeleton-forming compound condensed by hydrolysis is left to stand or slowly stirred for aging at 25-90° C. for about 20-60 hours. Gelation proceeds by aging, to form a wet gel containing silicon oxide.

(i-2) Substitution of Dispersing Medium

A dispersing medium of the wet gel influences a surface tension and/or a contact angle of a solid phase to a liquid phase, which accelerate or retard aging, an extent of surface modification in the organic modification step, and an evaporation rate of the dispersing medium in the later-described coating step. The dispersing medium contained in the gel can be substituted by another dispersing medium by repeating an operation of pouring another dispersing medium into the gel, vibrating the gel and conducting decantation. The substitution of the dispersing medium may be conducted before or after an organic modification reaction, though it is preferably conducted before the organic modification reaction to reduce the number of steps.

Specific examples of the substituting dispersing media include ethanol, methanol, propanol, butanol, pentane, hexane, heptane, cyclohexane, toluene, acetonitrile, acetone, dioxane, methyl isobutyl ketone, propylene glycol monomethyl ether, ethylene glycol monomethyl ether, and ethyl acetate. These dispersing media may be used alone or in combination.

The preferred substituting dispersing media are ketones. Substitution with a ketone solvent before the later-described ultrasonic treatment step makes it possible to obtain a well-dispersible, organically modified, silica-containing sol. Because the ketone solvent has excellent affinity for silica (silicon oxide) and organically modified silica, organically modified silica is well dispersed in the ketone solvent. The preferred ketone solvent has a boiling point of 60° C. or higher. Ketones having boiling points of lower than 60° C. are evaporated too much in the later-described ultrasonic irradiation step. For instance, acetone used as a dispersing medium is much evaporated during the ultrasonic irradiation, resulting in difficulty in controlling the concentration of the dispersion. Acetone is quickly evaporated in the coating step, too, failing to keep a sufficient coating time. It is further known that acetone is harmful to humans, unpreferable for the health of operators.

Particularly preferred as the ketone solvent is unsymmetrical ketone having different groups on both sides of a carbonyl group. Because nonsymmetrical ketone has a large polarity, it has excellent affinity particularly for silica and organically modified silica. The organically modified silica preferably has a particle size of 200 nm or less in the dispersion. When the particle size of the organically modified silica is more than 200 nm, it is difficult to form a silica aerogel coating having a substantially smooth surface.

The ketone may have an alkyl or aryl group as a substituent group. The preferred alkyl group has about 1-5 carbon atoms. Specific examples of the ketone solvents include methyl isobutyl ketone, ethyl isobutyl ketone, and methyl ethyl ketone.

(i-3) Organic Modification

An organic-modifying agent solution is added to the wet gel, so that hydrophilic groups such as a hydroxyl group, etc. at the end of silicon oxide constituting the wet gel are substituted by hydrophobic organic groups.

(a) Organic-Modifying Agents (a-1) Saturated Organic-Modifying Agents

The preferred saturated organic-modifying agent is any of compounds represented by the following formulae (3)-(8);

  (3),

  (4),

  (5),

  (6),

  (7), and

  (8), wherein p represents an integer of 1-3, q represents an integer of 1-3 satisfying the condition of q=4−p, $R^b O$ represents an alkoxy group having 1-4 carbon atoms, and $R^c$ represents hydrogen, a substituted or unsubstituted alkyl group having 1-18 carbon atoms, or a substituted or unsubstituted aryl group having 5-18 carbon atoms, or a mixture thereof.

Specific examples of the saturated organic-modifying agents include triethylchlorosilane, trimethylchlorosilane, diethyldichlorosilane, dimethyldichlorosilane, acetoxytrimethylsilane, acetoxysilane, diacetoxydimethylsilane, methyltriacetoxysilane, phenyltriacetoxysilane, diphenyldiacetoxysilane, trimethylethoxysilane, trimethylmethoxysilane, 2-trimethylsiloxy pent-2-en-4-one, N-(trimethylsilyl)acetamide, 2-(trimethylsilyl)acetate, N-(trimethylsilyl)imidazole, trimethylsilyl propiolate, nonamethyltrisilazane, hexamethyldisilazane, hexamethyldisiloxane, trimethylsilanol, triethylsilanol, triphenylsilanol, t-butyldimethylsilanol, diphenylsilanediol, etc.

(a-2) Unsaturated, Organic-Modifying Agents

Preferred examples of the unsaturated organic-modifying agents are represented by the following formulae (9)-(14);

$$R^d_p SiCl_q \quad (9),$$

$$R^d_3 SiNHSiR^d_3 \quad (10),$$

$$R^d_p Si(OH)_q \quad (11)$$

$$R^d_3 SiOSiR^d_3 \quad (12),$$

$$R^d_p Si(OR^d)_q \quad (13),$$

$$R^d_p Si(OCOCH_3)_q \quad (14),$$

wherein p represents an integer of 1-3, q represents an integer of 1-3 meeting the condition of q=4−p, and $R^d$ represents an organic group having an ultraviolet-polymerizable, unsaturated bond and 2-10 carbon atoms. The unsaturated group $R^d$ may have a methyl group, an ethyl group, etc. as a substituent group. Examples of the unsaturated group $R^d$ include a vinyl group, an allyl group, a methacryloxy group, an aminopropyl group, a glycidoxy group, an alkenyl group, and a propargyl group. The unsaturated organic-modifying agent may be used alone or in combination. The unsaturated organic-modifying agent may be combined with the saturated organic-modifying agent.

The unsaturated organic-modifying agent is preferably unsaturated chlorosilane, more preferably unsaturated monochlorosilane having three unsaturated groups. Specific examples of the unsaturated organic-modifying agents include triallylchlorosilane, diallyldichlorosilane, triacetoxyallylsilane, diacetoxydiallylsilane, trichlorovinylsilane, dichlorodivinylsilane, triacetoxyvinylsilane, diacetoxydiallylsilane, trimethoxy(3-butenyl)silane, triethoxy(3-butenyl)silane, di(3-butenyl)dimethoxysilane, di(3-butenyl)diethoxysilane, etc.

(b) Organic Modification Reaction

The organic-modifying agent is preferably dissolved in a solvent such as hydrocarbons such as pentane, hexane, cyclohexane, heptane, etc.; ketones such as acetone, etc.; aromatic compounds such as benzene, toluene, etc. The organic modification is preferably conducted at 10-40° C., although variable depending on the type and concentration of the organic-modifying agent. When the organic-modifying temperature is lower than 10° C., the organic-modifying agent does not easily react with silicon oxide. When it is higher than 40° C., the organic-modifying agent easily reacts with other substances than silicon oxide. The solution is preferably stirred to avoid a distribution in temperature and concentration in the solution during the reaction. For instance, when the organic-modifying agent solution is a solution of triethylchlorosilane in hexane, holding at 10-40° C. for about 20-40 hours (for instance, 30 hours) sufficiently turns a silanol group to a silyl group.

(i-4) Ultrasonic Treatment

The ultrasonic treatment turns the organically modified silica gel and/or sol to be suitable for coating. In the case of the organically modified silica gel, the ultrasonic treatment dissociates a gel coagulated by an electric force and a van der Waals force, and destroys covalent bonds of silicon to oxygen, resulting in a dispersed gel. In the case of the sol, too, the ultrasonic treatment reduces the agglomeration of colloid particles. The ultrasonic treatment can be conducted in a dispersing apparatus using an ultrasonic vibrator. An ultrasonic radiation frequency is preferably 10-30 kHz, and an output is preferably 300-900 W.

The ultrasonic treatment time is preferably 5-120 minutes. Longer ultrasonic irradiation results in finer pulverization of clusters of the gel and/or sol, resulting in less agglomeration. Accordingly, colloid particles of organically modified silicon oxide are almost in a single dispersion state in the silica-containing sol obtained by the ultrasonic treatment. When the ultrasonic treatment time is shorter than 5 minutes, the colloid particles are not sufficiently dissociated. Even if the ultrasonic treatment time were longer than 120 minutes, the dissociation of the colloid particles of the organically modified silicon oxide would not substantially change.

To form a silica aerogel coating having a porosity of 55-80% and a refractive index of 1.09-1.19, the ultrasonic radiation frequency is preferably 10-30 kHz, the output is preferably 300-900 W, and the ultrasonic treatment time is preferably 5-120 minutes.

A dispersing medium may be added to provide the wet gel with appropriate concentration and fluidity. The dispersing medium may be added before the ultrasonic treatment, or after conducting the ultrasonic treatment to some extent. A mass ratio of the organically modified silicon oxide to the dispersing medium is preferably 0.1-20%. When the mass ratio of the organically modified silicon oxide to the dispersing medium is outside the range of 0.1-20%, a uniform thin layer cannot be formed easily.

The use of a sol containing silicon oxide colloid particles having nearly single dispersion can form an organically modified silica aerogel layer with small porosity. On the other hand, the use of a sol containing largely agglomerated colloid particles can form a silica aerogel layer with large porosity. Thus, the ultrasonic treatment time influences the porosity of the silica aerogel coating. The coating of the sol ultrasonic-treated for 5-120 minutes can provide the organically modified silica aerogel layer with a porosity of 55-80%.

(iv) Coating

Examples of wet-coating methods include a spray-coating method, a spin-coating method, a dip-coating method, a flow-coating method and a bar-coating method. The preferred coating method is a spray-coating method, which can form a layer with uniform thickness. When the coating liquid is applied to a substrate, a dispersing medium is evaporated to form an organically modified silica layer.

(v) Drying

Because the coating liquid contains a volatile solvent, it may be spontaneously dried, but its drying may be accelerated by heating at 50-100° C. Although the organically modified silica aerogel layer has a porosity reduced by the shrinkage of the gel due to capillary pressure during the evaporation of the dispersing medium, the porosity is recovered by a springback phenomenon after the completion of evaporation. Thus, the porosity of the dried, organically modified silica aerogel layer is substantially as large as the original one of the gel network. The shrinkage of a silica gel network and the springback phenomenon are described in U.S. Pat. No. 5,948,482 in detail.

(vii) Baking

The coating is preferably baked at 50-150° C. The baking removes a solvent from the layer and a hydroxyl group, etc. from the surface, thereby strengthening the coating. Decomposition does not substantially occur at a baking temperature of about 50-150° C.

(4) Substrate

The refractive index of the substrate 3 is 1.45-1.72, preferably 1.50~1.70, more preferably 1.51-1.60 in a wavelength range of 400-700 nm. Because the anti-reflection coating 1 exhibits an excellent anti-reflection function to a substrate 3 having a refractive index of 1.45-1.72, it is effective to reduce the size of an exchange lens unit. Specific examples of materials for the substrate 3 include optical glass such as LF5, BK7, BAK1, BAK2, K3, PSK2, SK4, SK5, SK7, SK11, SK12, SK14, SK15, SK16, SK18, KF3, SK6, SK8, BALF2, SSK5, LLF1, LLF2, LLF6, BAF10, BAF11, BAF12, F1, F5, F8, F16, SF2, SF7, KZF2, KZF5, LAK11, LAK12, etc.

(5) Reflectance

The anti-reflection coating 1 formed on the substrate 3 has reflectance of preferably 0.3% or less, more preferably 0.26% or less, to incident light at 0° in a wavelength range of 450-600 nm.

[2] Fluororesin Layer

Figure 2:
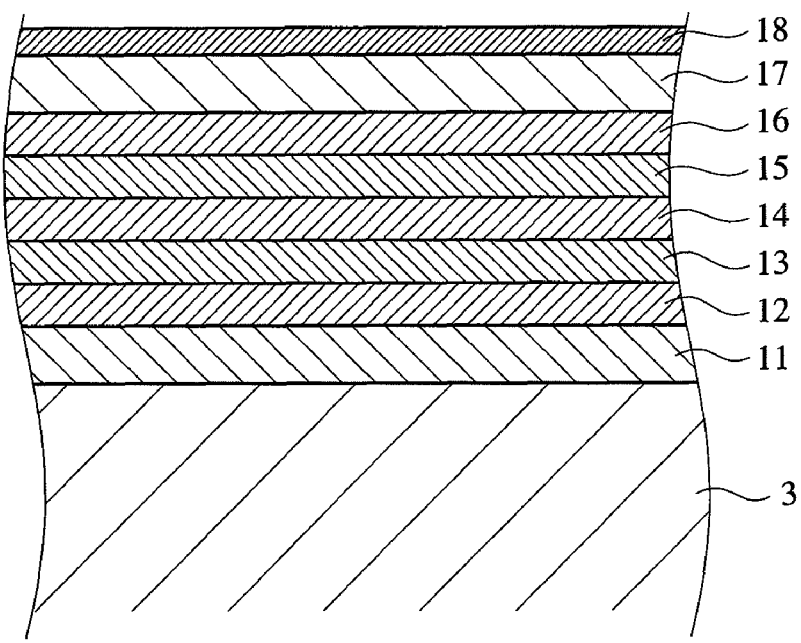
FIG. 2 is a cross-sectional view showing the anti-reflection coating formed on a substrate according to another embodiment of the present invention.

As shown in FIG. 2, a fluororesin layer 18 having water repellency or water/oil repellency (simply called "water/oil repellency") may be formed on the seventh layer 17. The fluororesins are not particularly restricted as long as they are colorless and transparent, but they are preferably fluorine-containing polymers, fluorinated pitch, or organic-inorganic hybrid polymers.

The fluorine-containing polymers are preferably fluorine-containing olefinic polymers or copolymers, such as polytetrafluoroethylene (PTFE), tetraethylene-hexafluoropropylene copolymers (PFEP), ethylene-tetrafluoroethylene copolymers (PETFE), tetrafluoroethylene-perfluoroalkyl vinyl ether copolymers (PFA), ethylene-chlorotrifluoroethylene copolymers (PECTFE), tetrafluoroethylene-hexafluoropropylene-perfluoroalkyl vinyl ether copolymers (PEPE), polychlorotrifluoroethylene (PCTFE), polyvinylidene fluoride (PVDF), polyvinyl fluoride (PVF), etc. Commercially available fluorine-containing polymers may be, for instance, "OPSTAR" available from JSR Corporation, "CYTOP" available from Asahi Glass Co., Ltd.

The fluorine-containing organic-inorganic hybrid polymers may be organic silicon polymers having fluorocarbon groups, which may be polymers obtained by the hydrolysis of fluorine-containing silane compounds. The fluorine-containing silane compounds may be compounds represented by the following formula (15):

$$CF_3(CF_2)_a(CH_2)_2SiR_bX_c \quad (15),$$

wherein R is an alkyl group, X is an alkoxyl group or a halogen atom, a is an integer of 0-7, b is an integer of 0-2, c is an integer of 1-3, and b+c=3. Specific examples of the compounds represented by the formula (15) include $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_3SiCH_3(OCH_3)_2$, $CF_3(CF_2)_7(CH_2)_2SiCH_3Cl_2$, etc. Examples of commercially available organic silicon polymers include Novec EGC-1720 available from Sumitomo 3M Ltd., XC98-B2472 available from GE Toshiba Silicone Co., Ltd., X71-130 available from Shin-Etsu Chemical Co., Ltd., etc.

The fluororesin layer 18 is as thick as preferably 0.4-100 nm, more preferably 10-80 nm. When the thickness of the fluororesin layer is less than 0.4 nm, sufficient water/oil repellency cannot be obtained. On the other hand, with the fluororesin layer thicker than 100 nm, the anti-reflection coating has deteriorated transparency and changed optical properties. The refractive index of the fluororesin layer is preferably 1.5 or less, more preferably 1.45 or less. Although the fluororesin layer may be formed by a vacuum vapor deposition method, it is preferably formed by a wet method such as a sol-gel method.

The present invention will be explained in further detail by Examples below without intention of restricting the present invention thereto.

Example 1

An anti-reflection coating 1 having the layer structure shown in Table 1 was produced by the following steps. The refractive index of each layer was measured with light having a wavelength of 550 nm.

[1] Formation of First to Sixth Layers

Figure 7:
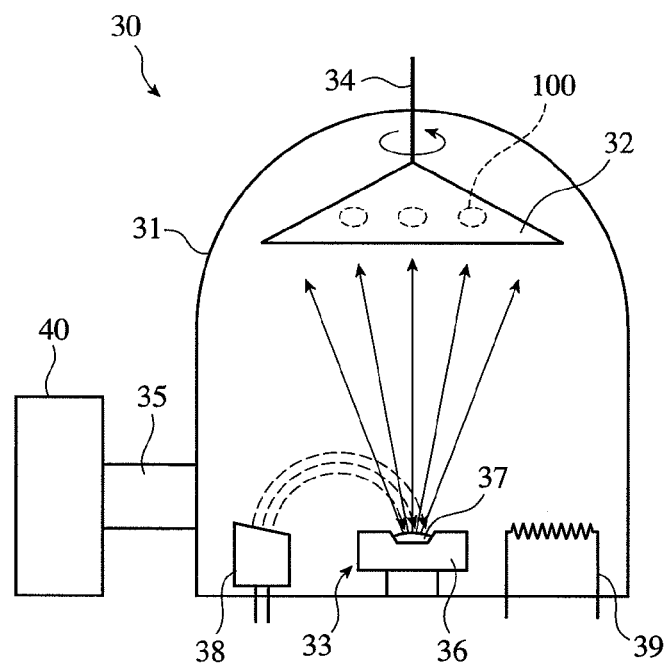
FIG. 7 is a schematic view showing an example of apparatuses for forming the anti-reflection coating.

Using the apparatus shown in FIG. 7, the first to sixth layers shown in Table 1 were formed on an optical lens of LF5 by an electron-beam vacuum vapor deposition method at an initial degree of vacuum of $1.2 \times 10^{-5}$ Torr and a substrate temperature of 230° C.

[2] Formation of Seventh Layer

A silica aerogel layer as the seventh layer was formed by a sol-gel method comprising the following steps.

(2-i) Preparation of Wet Silica Gel

After 5.21 g of tetraethoxysilane and 4.38 g of ethanol were mixed, 0.4 g of hydrochloric acid (0.01 N) was added, and stirring was conducted for 90 minutes. With 44.3 g of ethanol and 0.5 g of ammonia water (0.02 N) added, stirring was conducted for 46 hours, and then this mixed solution was aged at 60° C. for 46 hours to obtain a wet silica gel.

(2-ii) Preparation of Dispersion of Organically Modified Silica

The wet silica gel was mixed with ethanol, vibrated for 10 hours, and then decanted to remove unreacted materials, and to change the wet-gel-dispersing medium to ethanol. With methyl isobutyl ketone (MIBK) added, the ethanol-dispersed wet gel was vibrated for 10 hours, and then decanted to change the dispersing medium from ethanol to MIBK.

The wet silica gel was mixed with a solution of trimethylchlorosilane in MIBK (concentration: 5% by volume) and stirred for 30 hours to organically modify silicon oxide at ends. The resultant organically modified wet silica gel was washed with MIBK by vibration for 24 hours and decantation.

MIBK was added to the organically modified wet silica gel to a concentration of 3% by mass, and ultrasonic irradiation (20 kHz, 500 W) was conducted for 20 minutes to turn the wet silica gel to a sol-like, organically modified silica (dispersion of the organically modified silica).

(2-iv) Spin-Coating

The coating liquid containing the organically modified silica was applied to the sixth layer by a spin-coating method, and baked at 150° C. for 1 hour to form a silica aerogel coating, in which the silica sol was hydrolyzed and polycondensed to have organically modified chains. The thickness of the silica aerogel layer is shown in Table 1.

TABLE 1

| No. | Material | Refractive Index | Optical Thickness (nm) |
|---|---|---|---|
| Substrate | LF5 | 1.584 | — |
| First Layer | $Al_2O_3$ | 1.650 | 147.5 |
| Second Layer | $Ta_2O_5 + Y_2O_3 + Pr_6O_{11}$ | 2.050 | 40.4 |
| Third Layer | $MgF_2$ | 1.380 | 47.1 |
| Fourth Layer | $Ta_2O_5 + Y_2O_3 + Pr_6O_{11}$ | 2.050 | 53.9 |
| Fifth Layer | $MgF_2$ | 1.380 | 90.3 |
| Sixth Layer | $Ta_2O_5 + Y_2O_3 + Pr_6O_{11}$ | 2.050 | 21.1 |

TABLE 1-continued

| No. | Material | Refractive Index | Optical Thickness (nm) |
|---|---|---|---|
| Seventh Layer | Silica Aerogel | 1.150 | 143.0 |
| Medium | Air | 1.000 | — |

Example 2

An anti-reflection coating having the layer structure shown in Table 2 was formed in the same manner as in Example 1.

TABLE 2

| No. | Material | Refractive Index | Optical Thickness (nm) |
|---|---|---|---|
| Substrate | LF5 | 1.584 | — |
| First Layer | $Al_2O_3$ | 1.650 | 200.0 |
| Second Layer | $Ta_2O_5 + Y_2O_3 + Pr_6O_{11}$ | 2.050 | 50.0 |
| Third Layer | $MgF_2$ | 1.380 | 52.5 |
| Fourth Layer | $Ta_2O_5 + Y_2O_3 + Pr_6O_{11}$ | 2.050 | 60.0 |
| Fifth Layer | $MgF_2$ | 1.380 | 90.0 |
| Sixth Layer | $Ta_2O_5 + Y_2O_3 + Pr_6O_{11}$ | 2.050 | 25.0 |
| Seventh Layer | Silica Aerogel | 1.150 | 130.0 |
| Medium | Air | 1.000 | — |

Example 3

An anti-reflection coating having the layer structure shown in Table 3 was formed in the same manner as in Example 1.

TABLE 3

| No. | Material | Refractive Index | Optical Thickness (nm) |
|---|---|---|---|
| Substrate | KF3 | 1.466 | — |
| First Layer | $Al_2O_3$ | 1.650 | 147.5 |
| Second Layer | $ZrO_2 + TiO_2$ | 2.110 | 40.4 |
| Third Layer | $SiO_2$ | 1.462 | 47.1 |
| Fourth Layer | $ZrO_2 + TiO_2$ | 2.110 | 53.9 |
| Fifth Layer | $SiO_2$ | 1.462 | 90.3 |
| Sixth Layer | $ZrO_2 + TiO_2$ | 2.110 | 21.1 |
| Seventh Layer | Silica Aerogel | 1.150 | 143.0 |
| Medium | Air | 1.000 | — |

Example 4

An anti-reflection coating having the first to seventh layers shown in Table 4 was formed on an optical lens of LF5 in the same manner as in Example 1, immersed in a coating liquid comprising 3 g of a silicone-type fluororesin ("X71-130" available from Shin-Etsu Chemical Co., Ltd.) and 60 g of hydrofluoroether, lifted out of the coating liquid at 300 mm/minute, and dried at room temperature for 24 hours to obtain a fluororesin layer.

TABLE 4

| No. | Material | Refractive Index | Optical Thickness (nm) |
|---|---|---|---|
| Substrate | LF5 | 1.584 | — |
| First Layer | $Al_2O_3$ | 1.650 | 147.5 |
| Second Layer | $Ta_2O_5 + Y_2O_3 + Pr_6O_{11}$ | 2.050 | 40.4 |
| Third Layer | $MgF_2$ | 1.380 | 47.1 |
| Fourth Layer | $Ta_2O_5 + Y_2O_3 + Pr_6O_{11}$ | 2.050 | 53.9 |
| Fifth Layer | $MgF_2$ | 1.380 | 90.3 |

TABLE 4-continued

| No. | Material | Refractive Index | Optical Thickness (nm) |
|---|---|---|---|
| Sixth Layer | $Ta_2O_5 + Y_2O_3 + Pr_6O_{11}$ | 2.050 | 21.1 |
| Seventh Layer | Silica Aerogel | 1.150 | 143.0 |
| Eighth Layer | Fluororesin Layer | 1.400 | 35.0 |
| Medium | Air | 1.000 | — |

Comparative Example 1

An anti-reflection coating having the layer structure shown in Table 5 was formed in the same manner as in Example 1. In the anti-reflection coating of Comparative Example 1, the seventh layer was made of $MgF_2$.

TABLE 5

| No. | Material | Refractive Index | Optical Thickness (nm) |
|---|---|---|---|
| Substrate | LF5 | 1.584 | — |
| First Layer | $Al_2O_3$ | 1.651 | 36.38 |
| Second Layer | $ZrO_2$ | 2.050 | 24.25 |
| Third Layer | $MgF_2$ | 1.389 | 37.34 |
| Fourth Layer | $ZrO_2$ | 2.050 | 102.74 |
| Fifth Layer | $MgF_2$ | 1.389 | 25.09 |
| Sixth Layer | $ZrO_2$ | 2.050 | 82.84 |
| Seventh Layer | $MgF_2$ | 1.389 | 134.32 |
| Medium | Air | 1.000 | — |

Figure 3:
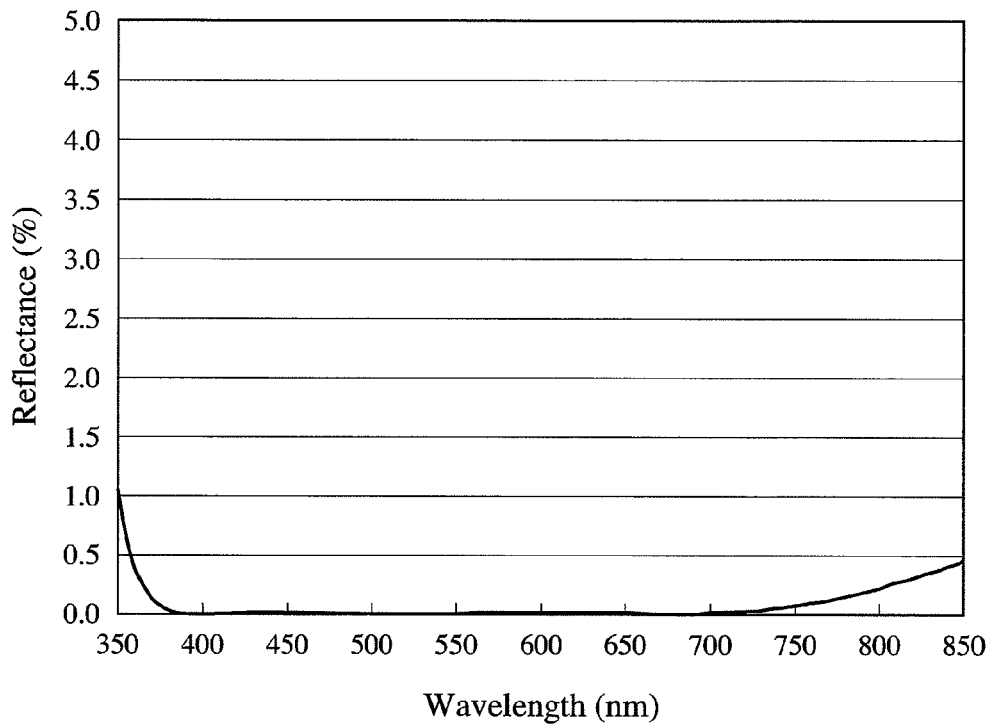
FIG. 3 is a graph showing the spectral reflectance of the anti-reflection coating of Example 1.
Figure 4:
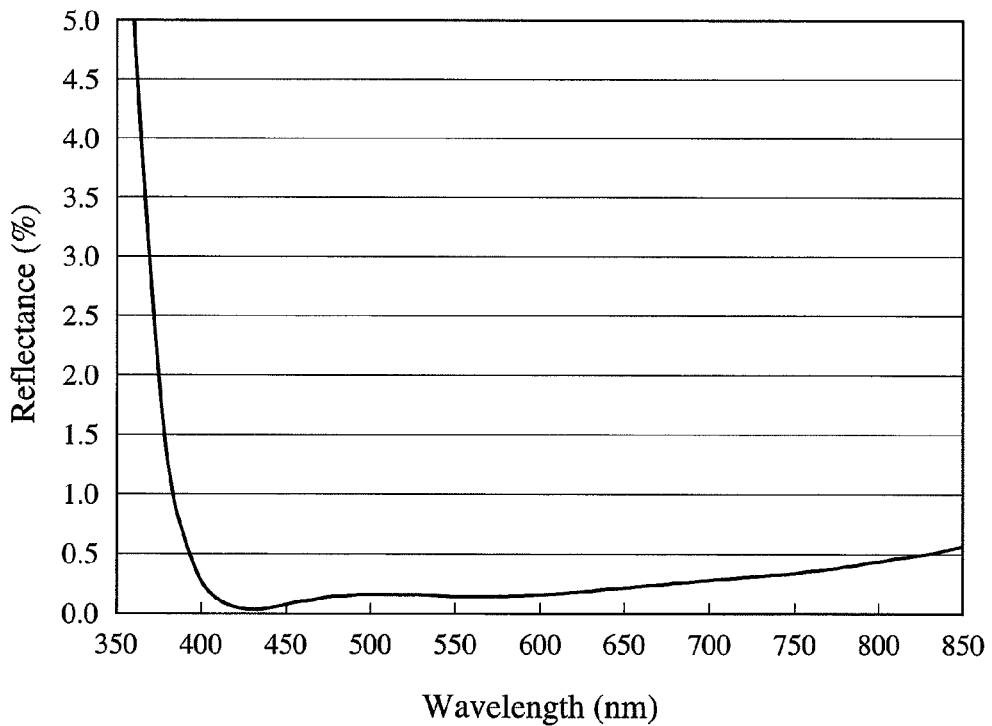
FIG. 4 is a graph showing the spectral reflectance of the anti-reflection coating of Example 2.
Figure 5:
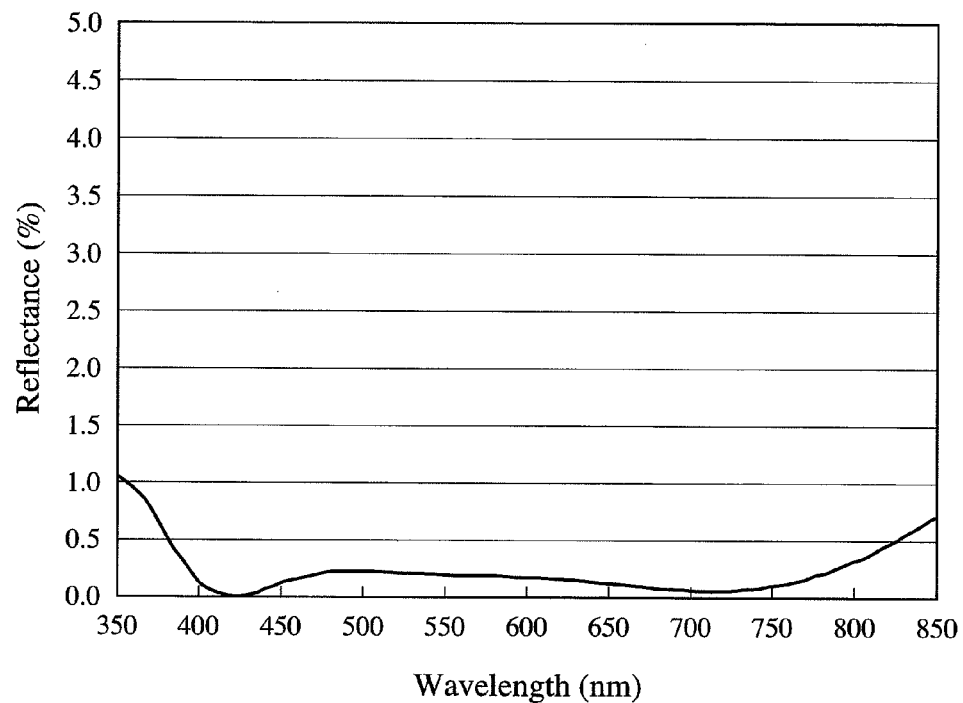
FIG. 5 is a graph showing the spectral reflectance of the anti-reflection coating of Example 3.
Figure 6:
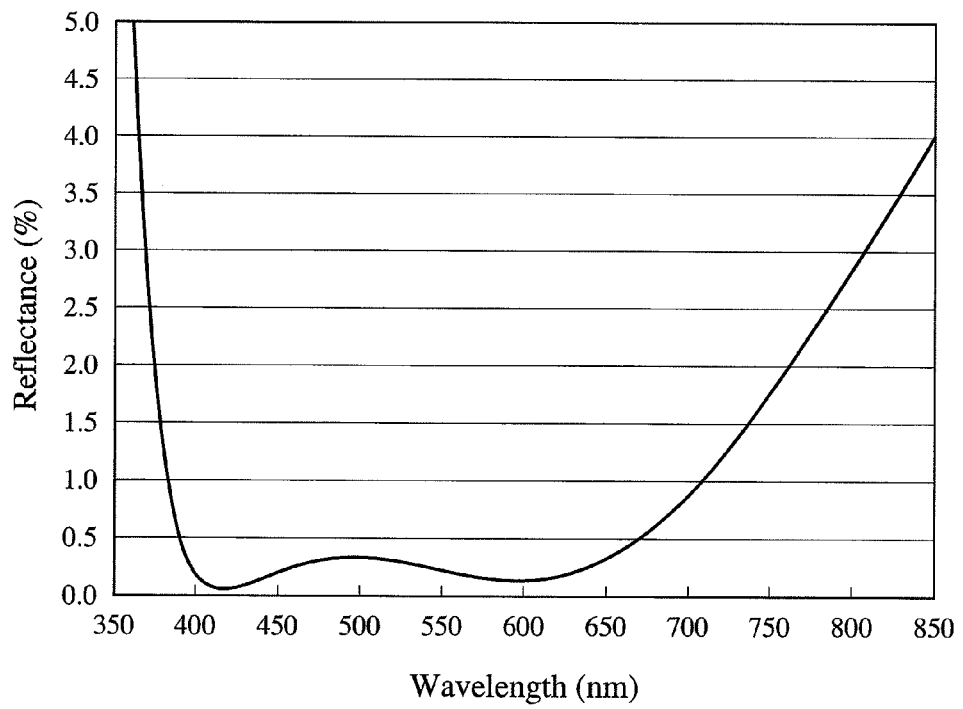
FIG. 6 is a graph showing the spectral reflectance of the anti-reflection coating of Comparative Example 1.

FIGS. 3-6 show the spectral reflectance characteristics of the anti-reflection-coated optical lenses of Examples 1-3 and Comparative Example 1, which were measured by light in a wavelength range of 350-850 nm at an incident angle of 0°. A medium in contact with the outermost layer was air. As shown in FIGS. 3-5, the anti-reflection coatings of Examples 1-3 exhibited low reflectance to visible light in a wavelength range of 400-700 nm. On the other hand, as shown in FIG. 6, the anti-reflection coating of Comparative Example 1 exhibited reflectance higher than 0.3% near a wavelength of 500 nmn.

Photographs taken with the optical lenses of Examples 1-4 had no flare and ghost, while those taken with the optical lens of Comparative Example 1 had flare and ghost.

EFFECT OF THE INVENTION

The seven-layer anti-reflection coating of the present invention has excellent anti-reflection performance to a glass substrate having a low to medium refractive index in a visible light wavelength of 400-700 nm, as well as excellent tarnish-preventing effect. Accordingly, it can be used to reduce the flare and ghost of exchange lens units for single-lens reflex cameras, etc., and to prevent their tarnish.

The present disclosure relates to subject matter contained in Japanese Patent Application No. 2008-047421 filed on Feb. 28, 2008, which is expressly incorporated herein by reference in its entirety.

What is claimed is:
1. An anti-reflection coating comprising first to seventh layers formed on a substrate in this order, said first layer being an alumina-based layer, said seventh layer being a porous, silica-based layer, and in a wavelength range of 400-700 nm,
said substrate having a refractive index of 1.45-1.72,
said first layer having an optical thickness of 25.0-250.0 nm, said second layer having a refractive index of 1.95-2.23 and an optical thickness of 27.5-52.5 nm, said third layer having a refractive index of 1.33-1.50 and an optical thickness of 37.5-54.0 nm, said fourth layer having a refractive index of 2.04-2.24 and an optical thickness of 45.0-62.5 nm, said fifth layer having a refractive index of 1.33-1.50 and an optical thickness of 77.5-102.5 nm, said sixth layer having a refractive index of 1.85-2.40 and an optical thickness of 16.0-26.5 nm, and said seventh layer having an optical thickness of 112.5-162.5 nm.

2. The anti-reflection coating according to claim 1, wherein said second layer, said fourth layer and said sixth layer are made of (a) at least one material selected from the group consisting of $Ta_2O_5$, $TiO_2$, $Nb_2O_5$, $ZrO_2$, $HfO_2$, $CeO_2$, $SnO_2$, $In_2O_3$, $ZnO$ and $Pr_6O_{11}$, or (b) a combination of at least one material selected from the group consisting of $Ta_2O_5$, $TiO_2$, $Nb_2O_5$, $ZrO_2$, $HfO_2$, $CeO_2$, $SnO_2$, $In_2O_3$, $ZnO$ and $Pr_6O_{11}$, and $Y_2O_3$, and said third layer and said fifth layer are made of (c) $MgF_2$ and/or $SiO_2$, or (d) a combination of $MgF_2$ and/or $SiO_2$, and $Al_2O_3$.

3. The anti-reflection coating according to claim 1, wherein said first layer has a refractive index of 1.58-1.71.

4. The anti-reflection coating according to claim 1, wherein said seventh layer has a refractive index of 1.09-1.19.

5. The anti-reflection coating according to claim 1, wherein said seventh layer is a silica aerogel layer.

6. The anti-reflection coating according to claim 1, which has reflectance of 0.3% or less to incident light at 0° in a wavelength range of 450-600 nm.

7. The anti-reflection coating according to claim 1, wherein a fluororesin layer as thick as 0.4-100 nm having water repellency or water/oil repellency is formed on said seventh layer.

8. The anti-reflection coating according to claim 1, wherein said first to sixth layers are formed by a physical film-forming method, and said seventh layer is formed by a wet method.

9. The anti-reflection coating according to claim 1, wherein said physical film-forming method is a vacuum vapor deposition method, and said wet method is a sol-gel method.

10. An optical member having the anti-reflection coating recited in claim 1.

11. An exchange lens unit comprising the optical member recited in claim 10.

12. An imaging device comprising the optical member recited in claim 10.

* * * * *